C. J. ALLEN.
TRACTOR.
APPLICATION FILED JUNE 9, 1920.
1,391,929.
Patented Sept. 27, 1921.
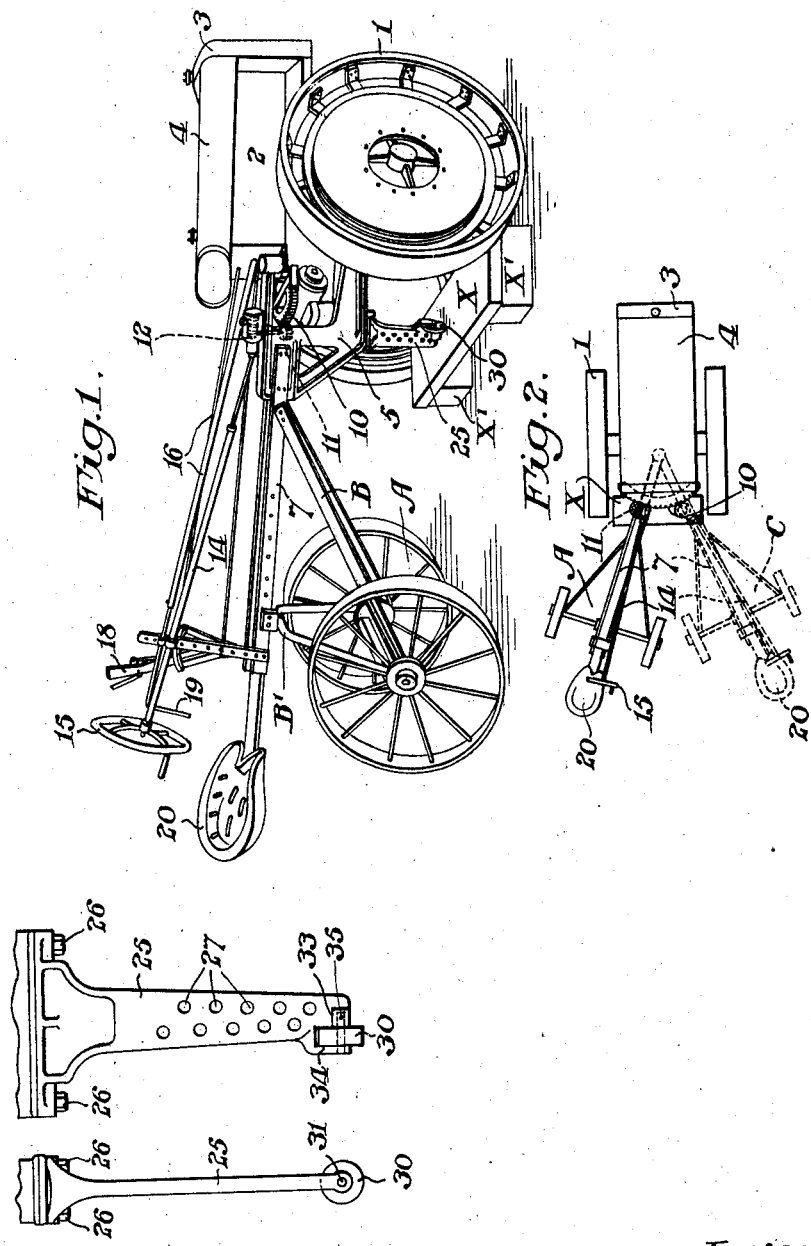
Witness:
R. H. Schleicher
Inventor:
Charles J. Allen,
By Blount, Moulton & Helket
Attorneys.

UNITED STATES PATENT OFFICE.

CHARLES J. ALLEN, OF MOORESTOWN, NEW JERSEY, ASSIGNOR TO S. L. ALLEN & CO., INC., A CORPORATION OF PENNSYLVANIA.

TRACTOR.

1,391,929.   Specification of Letters Patent.   Patented Sept. 27, 1921.

Application filed June 9, 1920. Serial No. 387,541.

*To all whom it may concern:*

Be it known that I, CHARLES J. ALLEN, a citizen of the United States, and a resident of Moorestown, county of Burlington, and State of New Jersey, have invented certain new and useful Improvements in Tractors, of which the following is a specification, reference being had to the accompanying drawing.

My invention relates more particularly to farm tractors of that type in which the power mechanism is supported on a pair of traction wheels and comprising a rearwardly extending beam which, when the tractor is coupled to a trailing implement, is adapted to extend thereover and be supported thereby, such tractors being intended for use with numerous forms of agricultural and other implements adapted for interchangeable connection therewith. Since the power mechanism and beam in tractors of this general type are rotatable about the axis of rotation of the traction wheels with respect to the wheels and vice versa, some form of supporting means, which ordinarily takes the form of a trailing implement, must at all times be supplied to maintain the beam in substantially horizontal position.

Hitherto, when it has been desired to substitute a given implement for another which has been coupled in operative relation to the tractor, it has been customary to turn the wheels and power mechanism of the tractor to a position of maximum angularity to the tractor beam and implement connected thereto, and then to move the other implement which is to be coupled to the tractor to a position in which it rests in substantially the same angular relation to the power mechanism and wheels of the tractor as the implement which is attached to the beam but upon the opposite side of the central line of the tractor. The beam is now uncoupled from the first implement and while supported by one man is traversed by another, generally by rotating the steering wheel, until it is brought into position over the second implement to which it is suitably coupled, to complete the operation. This method of effecting the interchange of implements involves numerous serious disadvantages, for it has been found that there is an ever present possibility that the man supporting the tractor beam may allow the same to drop with resulting injury to himself and to the beam and adjacent parts as well; that it is practically impossible for the operation to be effected by one man alone; and that the various steps necessary to effect its completion require considerable time and relatively heavy labor.

Among the principal objects of my invention is to provide means for facilitating the operation of interchanging the implements when desired.

More specifically, assuming, for example, that the tractor has been connected with a given agricultural implement such as a plow and it is desired to substitute for the plow a cultivator for the purpose of performing a cultivating instead of a plowing operation, it is a function and object of my invention to provide means for facilitating such interchange which are of such character and construction that they may be readily employed and embodied in tractors of ordinary form and design without material modification thereof.

Further objects of my invention are to provide in a tractor means for facilitating an interchange of implements therewith which are simple, not liable to get out of order, which in no wise interfere with the function and operation of the tractor, and by means of which the interchange may be effected by one man without danger to himself, without liability of injury to the tractor, and in a considerably shorter time than the interchange can be effected in the manner ordinarily practised at present.

My invention further includes all of the other objects and novel features of construction and arrangement hereinafter more definitely specified and described.

While for the purpose of carrying out the objects of my invention I may utilize in combination with a tractor any instrumentalities and combinations thereof suitable for effecting the same, I have in the accompanying drawing illustrated, and will now proceed to describe, a preferred embodiment of means adapted to effectuate the results intended. Since the invention is adapted for use and may be embodied in and combined with any suitable form of tractor, and as the form of implement with which the tractor is utilized bears no relation to the invention, I have in the said drawing shown the tractor proper more or less diagrammatically and have indicated the trailing implement merely as a pair of wheels suitably connected to the tractor beam, but it will, of course, be understood that the illustration of the implement is only typical and that in practice any suitable implement may be employed.

Referring more specifically to the drawing, Figure 1 is a perspective view of a farm tractor coupled to a pair of wheels which serve to indicate a trailing implement, the power mechanism and supporting wheels of the tractor being turned with relation to the beam and implement to the initial position usually employed when effecting an interchange of implements; Fig. 2 is a diagrammatic plan view of the tractor and implement shown in Fig. 1 but on a reduced scale, and showing in dotted lines the manner in which a second implement is preferably positioned with respect to the tractor during the operation of changing the implements and also the position of the tractor beam after the operation has been effected. Fig. 3 is a fragmentary view in side elevation of a portion of the tractor illustrating certain details of the invention and Fig. 4, a similar view in end elevation, these two views being on a considerably enlarged scale.

The tractor comprises the supporting and traction wheels 1, a suitable power mechanism or motor beneath a hood 2, radiator 3 and tank 4 supported over the motor, and is provided with a yoke 5 vertically pivoted on the transmission housing or other convenient part of the tractor for movement in a horizontal plane relatively thereto. Supported by and extending rearwardly from the yoke is a beam 7 of suitable form, that shown comprising a pair of laterally spaced members rotatable as a unit on a longitudinal axis with respect to the yoke, means for permitting such rotation and for supporting the beam with relation to the yoke forming the subject matter of my pending application for U. S. Letters Patent, Serial No. 336,383, filed November 7, 1919. For effecting a movement of the yoke about its vertical pivots, suitable means are provided which may conveniently comprise a segmental rack 10 rigidly supported with respect to the power mechanism, a pinion 11 housed in and carried by the yoke and suitably actuated through a worm gear 12 by the steering post 14 extending rearwardly over and supported by the beam, a steering wheel 15 at the extremity of the post affording a convenient means of rotating the same. Control rods 16 are also suitably supported above the beam and extend between the levers 18 and 19 adjacent the steering wheel and supported on the beam and the clutch and other parts of the power mechanism. An operator's seat 20 may be conveniently supported in the rear of the beam. All of the various parts hitherto described are entirely familiar to and thoroughly understood by those skilled in the art, and a more detailed description thereof therefore is superfluous.

In tractors of this general character it is customary to provide a member 25 beneath and either operatively secured to or integral with the yoke for the purpose of affording a point of attachment for certain types of trailing implements, and in the form of tractor shown this member, which may be termed the draft plate, is conveniently made separate from the yoke and attached thereto by suitable bolts 26, the member being provided with a plurality of holes 27 to facilitate attachment of a trailing implement thereto, and upon this plate or other convenient or suitable portion of the tractor and preferably on the yoke or other part connected thereto and movable therewith, I position means which, under certain conditions, are effective to support the yoke and in turn the parts which may be attached thereto and while effecting a support as aforesaid, to facilitate its movement in a direction generally transverse to the central line of the tractor. While said means may be of various forms I prefer to employ for this purpose suitable anti-friction means, for example and as shown in the drawing, a relatively small roller 30 rotatable on and supported by a pin or axle 31 supported adjacent the lower end of the draft plate in such position that a portion of the roller will extend slightly below the same with the face of the roller parallel to the central line of the tractor when the yoke is in central position with regard to the rack 10. While the pin 31 may be supported in any convenient way I prefer to enlarge the lower end of the draft plate to form a lug 33 and to form in the rear of but spaced from the lug an overhanging, downwardly depending support 34 and to provide suitable apertures in the support and lug for the reception of the pin, as best shown in Fig. 3, a transversely extending cotter key or pin 35 serving to hold the pin in assembled position, so that the roller will lie in a sort of recess formed between the main portion of the draft plate and the support 34.

It will be understood that a trailing implement is generally represented in the drawings as A, this implement being secured to the beam of the tractor by members B, B', which may be of any suitable or convenient form, and may extend either directly to the beam, as shown, or may in certain constructions and with certain types of implements extend both to the beam and to the draft plate, the particular manner of attaching or coupling the implement to the tractor being immaterial.

Assuming now that a tractor embodying my invention, a preferred form of which has hitherto been described, is coupled in operative relation with an implement A and that it is desired to substitute another implement C, the wheels 1 of the tractor are first turned to substantially the position shown in Fig. 1 and in full lines of Fig. 2, that is, until the beam is brought to substantially the limit of its travel in one direction from the center line of the tractor, and are preferably locked from rotation by setting the tractor brake or by blocks suitably placed. A plank X or other suitable support is then placed beneath the draft plate of the tractor in position to engage the roller 30, suitable blocks X' being placed under the plank if necessary to get the proper elevation. The implement C is then brought substantially to the position shown in Fig. 2, that is, into approximately the same position with regard to the supporting wheels of the tractor as has been assumed by implement A but upon the opposite side of the central line of the tractor. Implement A is now uncoupled from the beam or other portion of the tractor to which it was secured and the beam swung over to substantially the position shown in dotted lines in Fig. 2, preferably by rotation of the steering wheel 15, the roller 30 during this operation serving to support the yoke and beam and readily traversing the surface of the plank X. The beam now being in position to be coupled to implement C, the operation of changing the implements may be readily completed and implement A and plank X removed.

It will be evident that under the conditions just outlined the operation of interchanging implements with a tractor embodying my invention may be readily and easily effected by one man in a minimum amount of time; that at no time during the operation is the beam or the attendant parts left unsupported, whereby all danger of the beam being dropped on the ground with resulting injury to it or to persons in the vicinity is eliminated, and that the operator in making the change from one implement to the other is not called upon at any time to carry the beam and its attendant parts which are of relatively considerable weight. Furthermore, as the roller 30 moves readily over the plank, the beam may be traversed from its initial to its final position without any strain on the steering gear and with a minimum effort.

While I have herein described a preferred embodiment of my invention, I do not thereby desire or intend to limit myself to the precise details thereof to which I have referred, as the same may be modified as desired and the invention embodied in different forms of tractors than that illustrated and the roller suitably positioned on any convenient portion of the tractor other than the draft plate, without departing from the spirit and scope of the invention as defined in the appended claims.

Having thus described my invention, I claim and desire to protect by Letters Patent of the United States:—

1. The combination with a tractor having a power unit, supporting wheels, a rearwardly extending beam adapted for attachment to a vehicle or implement to be drawn by the tractor and a depending draft plate in operative relation therewith, of anti-friction means supported by and adjacent the lower extremity of the draft plate, said means being adapted to coact with a supporting surface whereby during an interchange of implements the weight of said beam is sustained, the tractor maintained in upright position and the horizontal traverse of the beam with respect to the power unit facilitated.

2. The combination with a tractor having a power unit, supporting wheels relatively movable with respect thereto, and a rearwardly extending beam vertically pivoted with respect to said power unit and vertically movable therewith adapted to be coupled to a vehicle or implement intended to be drawn by the tractor, of anti-friction means maintained in operative relation with said beam carried thereby and horizontally movable therewith comprising a member rotatable about an axis parallel with the longitudinal axis of said beam, said member being adapted to contact with a supporting surface to support the weight of said beam and to facilitate the horizontal movement thereof when said beam is traversed horizontally during the operation of interchanging vehicles or implements.

In witness whereof, I have hereunto set my hand this 7th day of June, 1920.

CHARLES J. ALLEN.